United States Patent [19]
Knodel et al.

[11] Patent Number: 5,775,595
[45] Date of Patent: Jul. 7, 1998

[54] GRAVITY FED SPRAYER

[76] Inventors: John J. Knodel, 439 Pauma Valley Way, Melbourne, Fla. 32940; Kenneth D. White, 6825 Cedar Ave., Cocoa, Fla. 32927

[21] Appl. No.: 603,033

[22] Filed: Feb. 16, 1996

[51] Int. Cl.$^6$ ..................................................... B05B 9/03
[52] U.S. Cl. .................. 239/375; 239/379; 239/531; 239/532; 239/578
[58] Field of Search ......................... 239/722, 754, 239/375, 376, 379, 531, 532, 578

[56] References Cited

U.S. PATENT DOCUMENTS

| | | | |
|---|---|---|---|
| 2,911,157 | 11/1959 | Converse | 239/754 |
| 3,915,382 | 10/1975 | Davis | 239/195 |
| 3,920,161 | 11/1975 | Kenzian | 239/722 X |
| 4,457,472 | 7/1984 | Geberth, Jr. | 239/532 |
| 4,485,971 | 12/1984 | Pajevic | 239/375 X |
| 4,621,770 | 11/1986 | Sayen | 239/304 |
| 4,982,896 | 1/1991 | Crow | 239/11 |
| 5,064,123 | 11/1991 | Aiello et al. | 239/706 |
| 5,088,232 | 2/1992 | Aumess et al. | 239/754 X |
| 5,271,564 | 12/1993 | Smith | 239/532 |
| 5,287,994 | 2/1994 | Dempsey | 222/158 |
| 5,361,849 | 11/1994 | Moore | 172/380 |
| 5,395,046 | 3/1995 | Knobbe et al. | 239/3 |
| 5,419,496 | 5/1995 | Novak, Jr. | 239/530 |
| 5,480,096 | 1/1996 | Wilson | 239/578 X |

*Primary Examiner*—Lesley D. Morris
*Attorney, Agent, or Firm*—Brian S. Steinberger; Law Offices of Brian S. Steinberger

[57] ABSTRACT

A sprayer apparatus for dispensing liquid fertilizer, weed control or liquid insecticide from an elongated storage tube using one hand. A see-through plastic storage tube has a spray nozzle one end and a handgrip with trigger on the opposite end. Compressing the trigger moves a trigger rod to move a piston that forces gravity fed liquid through the spray nozzle. The spray nozzle can be located in a housing having a convex curved outer surface along with a wheel protruding from the bottom surface of the housing. The wheel can have conical side edges and a flat exterior side. Alternatively, the wheel can have rounded outer edges. Visible markings on the exterior of the plastic storage tube can tell the user the remaining amount of the liquid stored inside. An optional protruding handgrip can be located halfway down the storage tube for allowing the device to be controlled by two hands. A second version includes a two way valve located inside the storage tube. The valve connects the spray nozzle to either the interior of the storage tube or to an interior siphon tube that has an opening located inside the handgrip. The two way valve allows the device to gravity feed liquid to the spray nozzle when the spray nozzle is located adjacent to the ground. The second position of the valve allows the device to suction liquid from inside the handgrip when the spray nozzle is oriented above the the handgrip.

13 Claims, 8 Drawing Sheets

GRAVITY FED SPRAYER

This invention relates to sprayers, and in particular to an apparatus for spraying weed control, insecticide and fertilizer with a longitudinal reservoir tube having a directional nozzle with a wheeled end and a handheld trigger end that can gravity feed liquid to the nozzle.

BACKGROUND AND PRIOR ART

Handheld spray bottles have been primarily used by homeowners to spray weeds and to provide water and liquid type fertilizers to plants and vegetation. However, the user must continuously bend over in order to squeeze the trigger and direct the spray for each application. Thus, the constant repetition of physically bending over can be very uncomfortable to the user. Further, traditional handheld sprayers require a siphon suction operation where a tube inside a storage container sucks up liquid to be dispensed. This siphon operation has many drawbacks. The tube must touch the inside bottom of the containers in order to work. Because of this limitation much of the liquid in the sprayer containers can not be drawn out which results in left over liquid that cannot be siphoned out. Other types of spray bottle require the use of one hand to hold a storage canister and another hand to hold the spray gun itself. U.S. Pat. 4,621,770 to Sayen has the two hand limitation problem along with the other problems expressed above.

Wand type stick sprayers have been used that also have many problems. U.S. Pat. Nos. 3,915,382 and 4,013,225 to Davis; 5,064,123 to Aiello; 5,271,564 to Smith; and 5,395,046 to Knobble et al. each require the use of separate compressed pressure supply devices in order to pressurize the contents to be sprayed. These devices require multiple components and moving parts that must be assembled that include metal valves, seals, long hoses, and piping. The combination of which would be expensive to a homeowner to use. U.S. Pat. Nos. 4,982,896 to Crow; 5,361,849 to Moore; and 5,419,496 to Novak, Jr. each describe spray wands that requires garden hose attachments in order to supply pressurized fluid to be dispensed and thus can probably not be used inside of a home. U.S. Pat. No. 5,287,994, Dempsey describes a metering liquid dispenser for plants using a "ball valve" 29 on the bottom of a tube 13 FIG. 1, where the ball itself must be compressed against a surface area in order to release liquid, column 4, lines 50–55. Constant compression of the valve can damage any fragile plants that need liquid fertilizer or insecticide. This ball valve does not allow for any fine directed spraying to take place and will not work for spraying insects such as spiders and the like in midair.

Thus, the need exists for solutions to the above listed problems in the prior art.

SUMMARY OF THE INVENTION

The first objective of the present invention is to provide a gravity spread fed sprayer apparatus that eliminates bending down or kneeling to accurately direct application where needed.

The second object of this invention is to provide a gravity fed sprayer apparatus that will eliminate problems encountered with a hand operated pump sprayer using a siphon.

The third object of this invention is to provide a sprayer apparatus that can pump out all the stored contents as compared to prior sprayers that leave liquid left inside.

The fourth object of this invention is to provide a sprayer apparatus that is easy to clean out after being used.

The fifth object of this invention is to provide a sprayer apparatus that dispenses liquid in a selected direction either held downward or upward without using prepressured supply attachments.

The sixth object of this invention is to provide a sprayer apparatus that can dispense liquid in a selected direction either held downward or upward with one hand by a hand squeeze.

Two embodiments of a trigger activated spray apparatus are disclosed. The first embodiment includes a handgrip having a movable trigger, the handgrip further having a curved hook portion for supporting the apparatus during non use, a sprayer nozzle, a hollow longitudinal storage tube for storing liquid, having a lower end connected to the sprayer nozzle and an upper end connected to the handgrip, the tube allowing for the liquid to be gravity fed to the piston than to the sprayer nozzle. The embodiment also includes a wheel attached to the sprayer housing, for allowing the apparatus to roll over surfaces, the wheel having conical side edges and a flat exterior edge, the wheel supported within a housing, the housing having a lower concave curved surface. Further the invention includes a spring compressable piston having an initial extended position and a compressed position for forcing a portion of the liquid in the storage tube through the spray nozzle, and a trigger rod parallel and exterior to the longitudinal tube for connecting the trigger to the spring compressable piston, wherein moving the trigger causes the piston to move to the compressed position. The wheel can have either a rounded exterior edge, or conical side edges with a flat exterior edge. An optional protruding second grip portion can be located approximately midway along the liquid storage tube.

A second version has the same components as the first version along with a siphon tube located inside the liquid storage container having one end adjacent to the spray nozzle and a second end located within the handgrip. The second version includes a two-way valve positioned adjacent to the spray nozzle having a first position for connecting the spray nozzle to the liquid storage tube and a second position for connecting the spray nozzle to the one end of the siphon tube, wherein the two positions of the valve allows for the movable trigger to withdraw liquid from the gravity fed storage container or alternatively from siphon tube. Both versions can dispense either liquid fertilizer, weed control or liquid insecticide.

Further objects and advantages of this invention will be apparent from the following detailed description of a presently preferred embodiment which is illustrated schematically in the accompanying drawings.

3

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

FIRST PREFERRED EMBODIMENT

Figure 1:
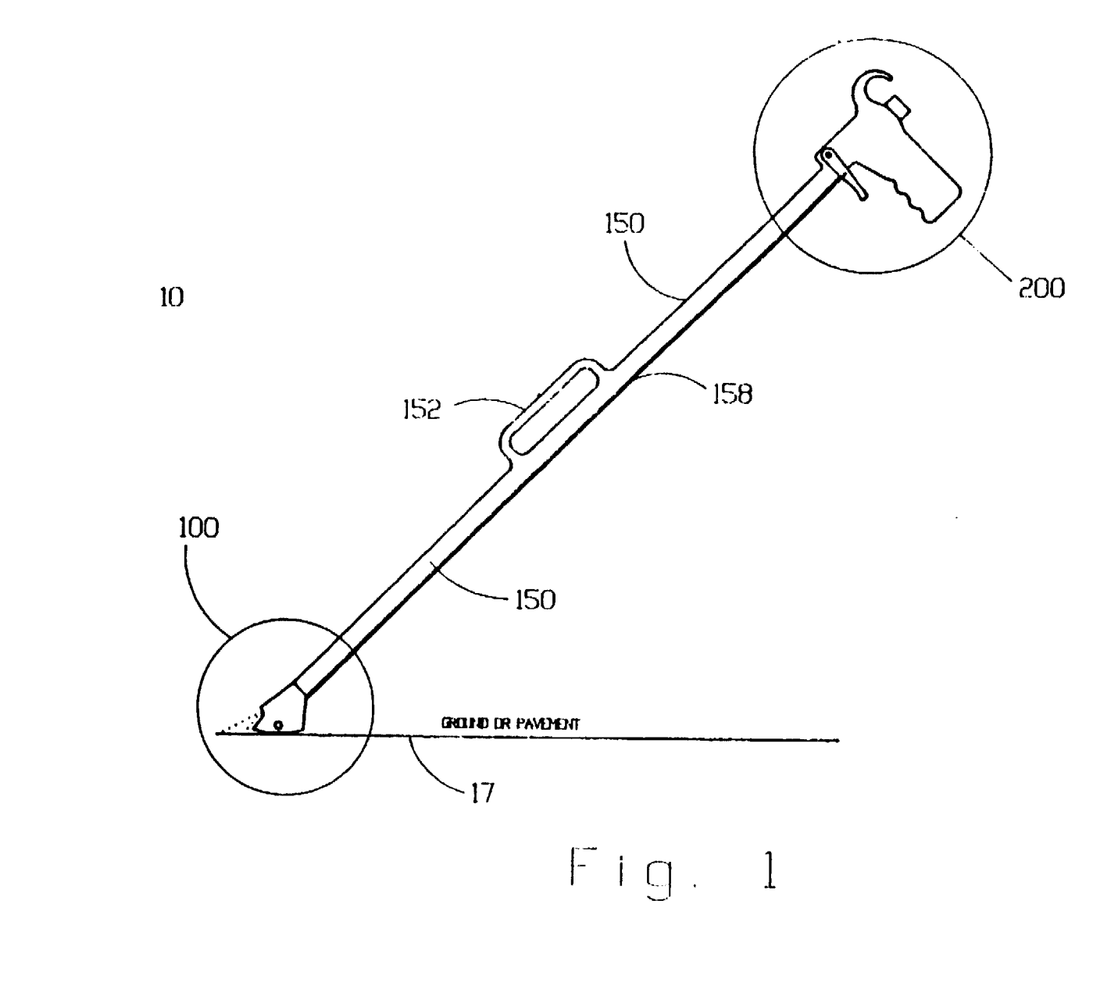
FIG. 1 is a perspective side view of a first preferred gravity fed sprayer embodiment.

FIG. 1 is a perspective side view of a first preferred gravity fed sprayer embodiment 10.

Figure 2A:
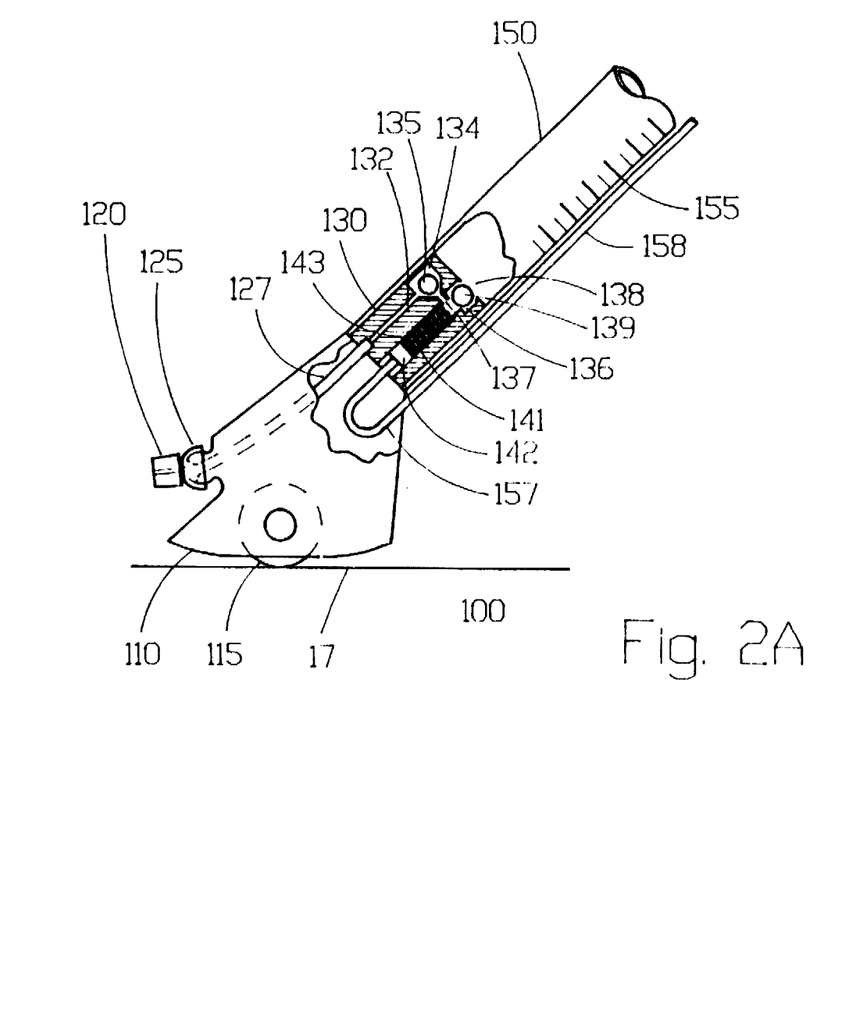
FIG. 2A is an enlarged cross-sectional view of the nozzle end of the gravity fed sprayer of FIG. 1 where the trigger is in a noncompressed position.
Figure 2B:
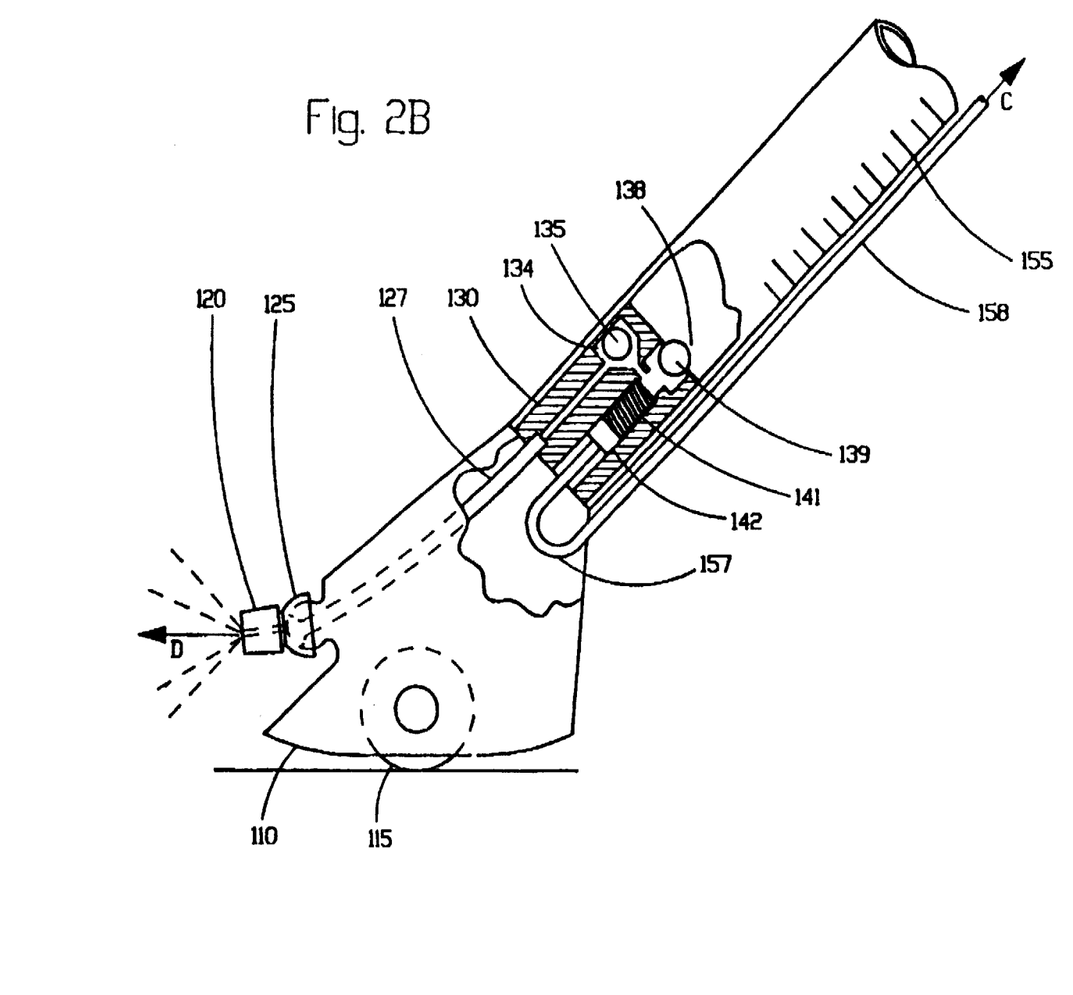
FIG. 2B is an enlarged cross-sectional view of the nozzle end of the gravity fed sprayer of FIG. 1 where the trigger is in a compressed position.
Figure 3:
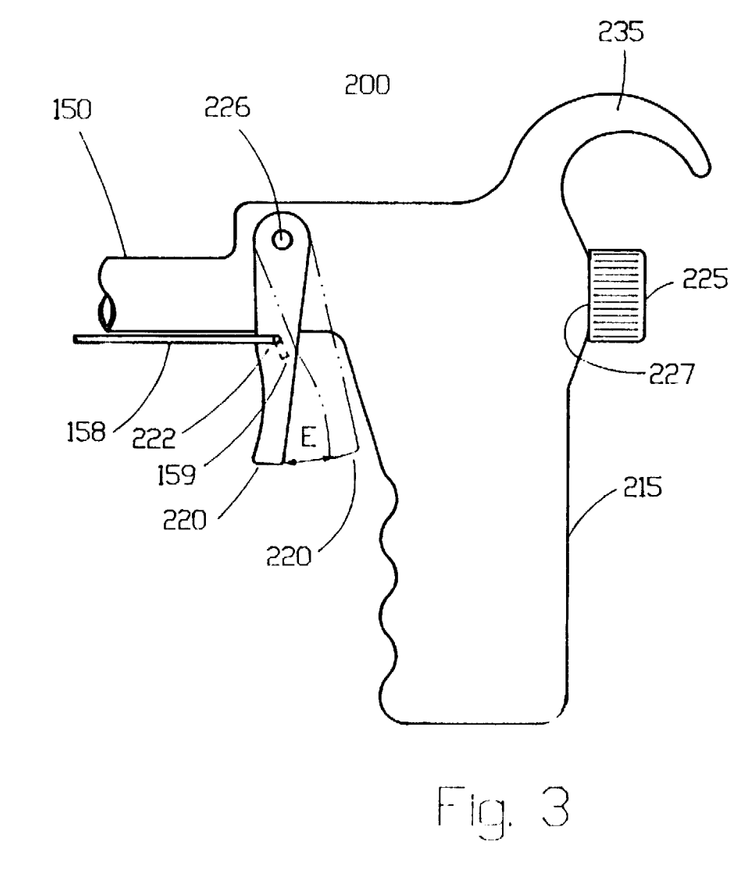
FIG. 3 is an enlarged view of the trigger end of the gravity fed sprayer of FIG. 1.

FIG. 2A is an enlarged cross-sectional view of the pump end 100 of the gravity fed sprayer 10 of FIG. 1 where the trigger 200 is in a noncompressed position. FIG. 2B is an enlarged cross-sectional view of the pump end 100 of the gravity fed sprayer 10 of FIG. 1 where the trigger 200 is in a compressed position. FIG. 3 is an enlarged view of the trigger end 200 of the gravity fed sprayer 10 of FIG. 1. Referring to FIGS. 1, 2A, 2B, and 3, embodiment 10 includes a nozzle end 100 sitting over ground/pavement 17, reservoir tubing section 150, optional midway handlegrip portion 152 and hand-trigger end 200. The hand-trigger end 200 includes a hollow pistol grip handle portion 215 having indentations for fingers 210 and a curved hook portion 235 for allowing the invention to be suspended by a nail, hook during storage. A screwable reservoir cap 225 having mateable interior threads 227 allows for the invention to be filled with liquid fertilizer, insecticide and the like. Pistol grip 215 is hollow and connected to boom/reservoir 150. A trigger 220 movable back and forth in the direction of arrow E rotates about pivot point 226 and is connected to such by a screw, and the like. A trigger rod 158 to be described in greater detail later attaches to trigger 220 at pivot point 222, where a bent portion 159 of rod 158 passes into the side of the trigger 220.

Referring to FIGS. 2A-2B and 3, nozzle end 100 includes a rotatably adjustable nozzle tip 120 which can adjust the spray from a narrow to a wide pattern. A ball and socket support 125 allows for the nozzle tip 120 to be able to swivel in an up and down, and side-to-side directions. A nozzle end interior tube 127 connects the nozzle tip 120 to a pump section 130 having an upper interior passageway 132 which connects to an upper interior chamber 134 with a floating ball-check valve 135 located therein. Connecting passageway 137 connects upper interior chamber 134 to lower interior chamber 136 which has a second floating ball-check valve 139 located therein.

An upper interior passageway 138 communicates between chamber 136 and the interior portion of reservoir 150. A piston 142 is positioned on the lower side of a spring 141 which are both located within a lower support passage-

4 way 143. Upper end of spring 141 abuts against a shoulder area formed inside pump section 130 and adjacent to passageway 137. Reservoir 150 can be a seethrough plastic tube where the liquid level inside can be determined by outer visible markings 155 that can delineate ounces and milliliters inside. Trigger 220 shown in FIG. 3 controls the piston 142 by way of the curved portion 157 of trigger rod 158. Compressing trigger 220' causes trigger rod 158 to move in the direction of arrow C further causing the position of curved portion 157 with piston 142 to compress spring 141 as shown in FIG. 2B. When piston 142 compresses spring 141, fluid inside chamber 136 causes ball-check valve 139 to close off chamber 138 and ball-check valve 135 moves sideways away from passageway 137 allowing fluid within chamber 134 to pass through tube 127 and out nozzle tip 120 in a spray pattern indicated by arrow D. Spring 141 expanding back to the size shown in FIG. 2A causes trigger 220 to return to it's initial position 220.

Figure 4A:
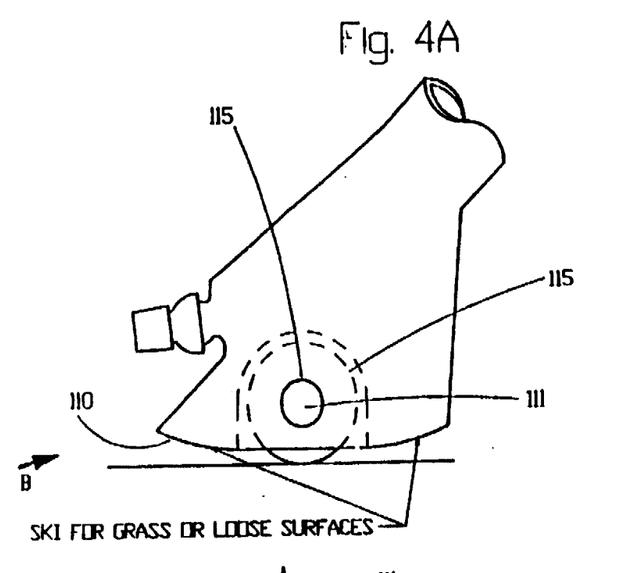
FIG. 4A is an enlarged view of the wheel portion of the gravity fed sprayer of FIG. 1.
Figure 4B:
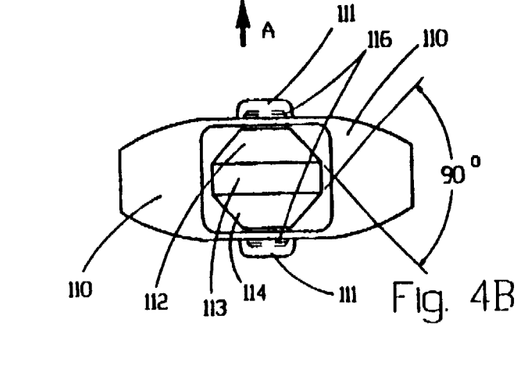
FIG. 4B is a bottom view of the wheel portion of FIG. 4A along arrow A.
Figure 4C:
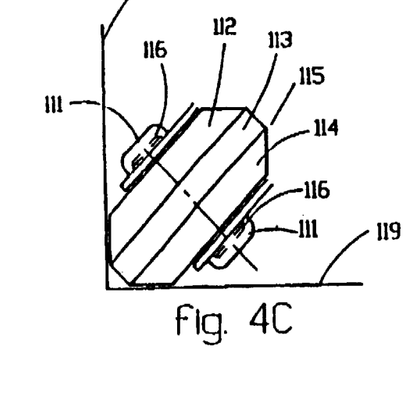
FIG. 4C is a front view of the wheel portion of FIG. 4A along arrow B when using the invention in an indoor corner region.

FIG. 4A is an enlarged view of the wheel portion 115 of the upside down sprayer of FIG. 1. FIG. 4B is a bottom view of the wheel portion 115 of FIG. 4A along arrow A. Referring to FIGS. 4A-4B, a preferred embodiment of the invention has a wheel 115 having conical shaped sides 112, 114 and a disc shaped middle portion 113. Alternatively outer sides 113 can be rounded. A protrusions 116 in the axle sides of wheel 115 can fit into a indented groove portion 111 formed within the sides of wheel area 100. The bottom surface of the wheel portion can be convex curved 110 which acts as a ski sliding surface when using the invention over grass and loose ground surfaces such as gravel and dirt. FIG. 4C is a front view of the wheel portion 115 of FIG. 4A along arrow B when using the invention in an indoor corner region 119 such as along the baseboards of a room.

SECOND PREFERRED EMBODIMENT

Figure 5A:
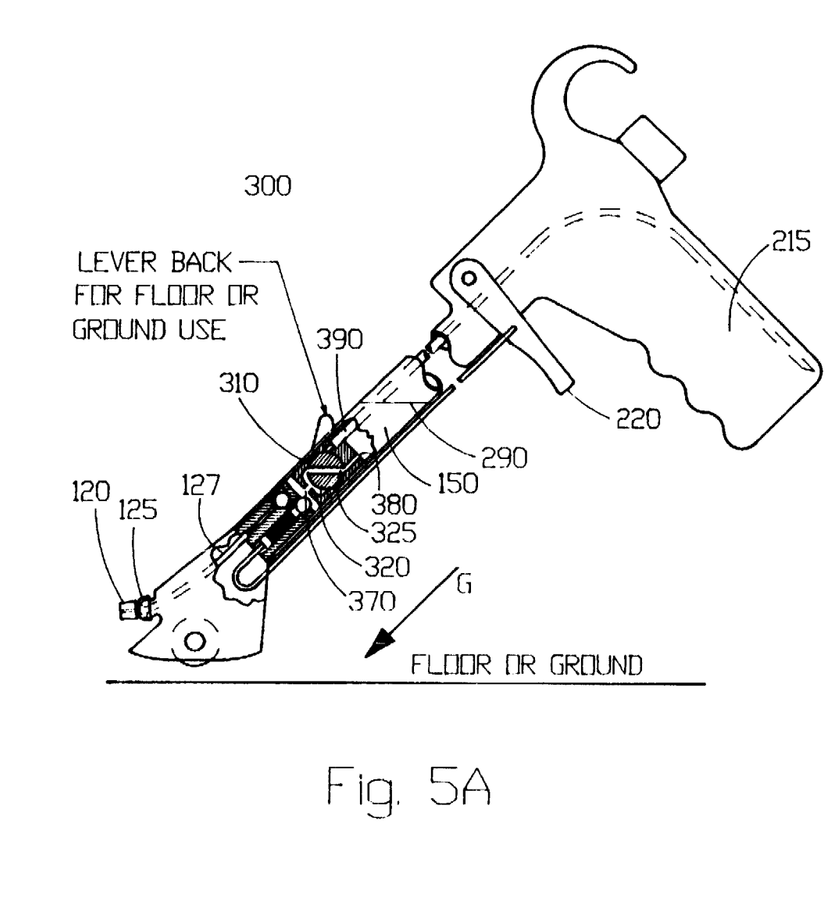
FIG. 5A is a perspective side view of a second preferred sprayer embodiment with a valve control in a first position allowing for gravity fed applications.

Fig. 5A is a perspective side view of a second preferred sprayer embodiment 300 with an exposed cross-sectional view of the valve control 320 allowing the embodiment to dispense a spray in a down position as shown by arrow G. Embodiment 300 has the same components as that of the preceding figures with the addition of a movable valve means 320. The orientation of the embodiment 300 along arrow G, liquid as shown by liquid level 290 within reservoir 150 can gravity feed by way of passage way 380 through valve 325 to chamber 370 and to the lower located sprayer nozzle components as was discussed in the preceding figures.

Figure 5B:
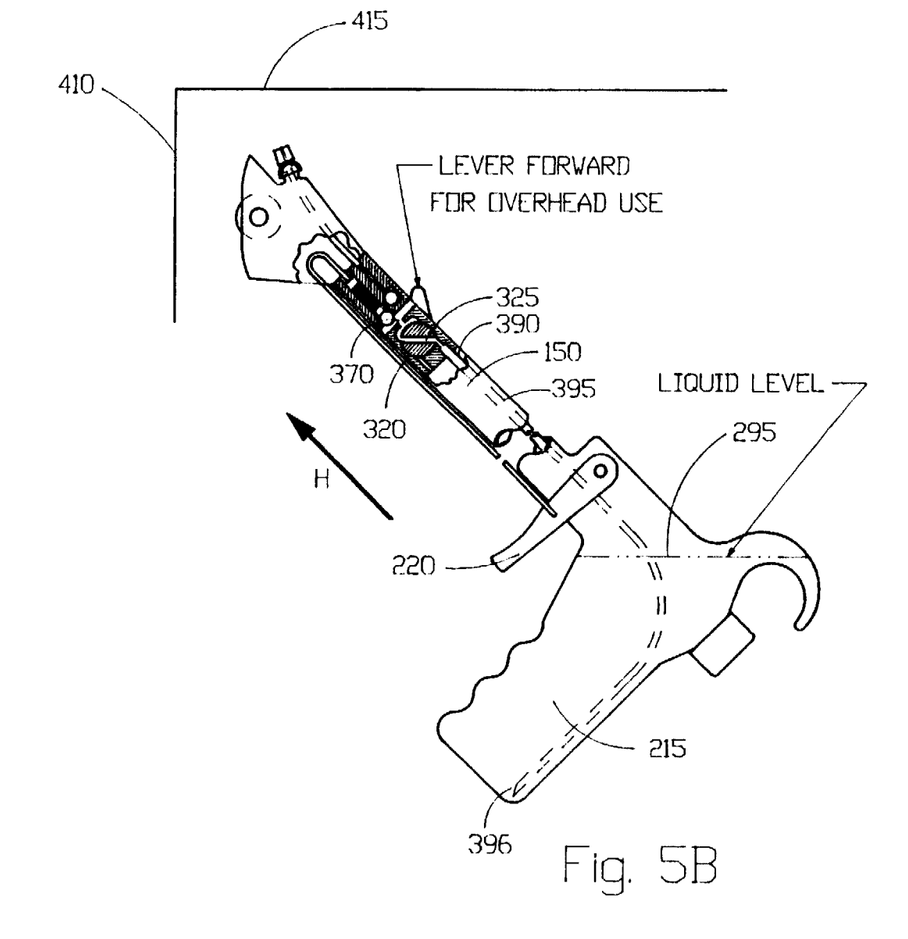
FIG. 5B is a perspective side view of the second preferred embodiment of FIG. 5A with the valve control in second position utilizing the siphon for overhead applications.
Figure 5C:
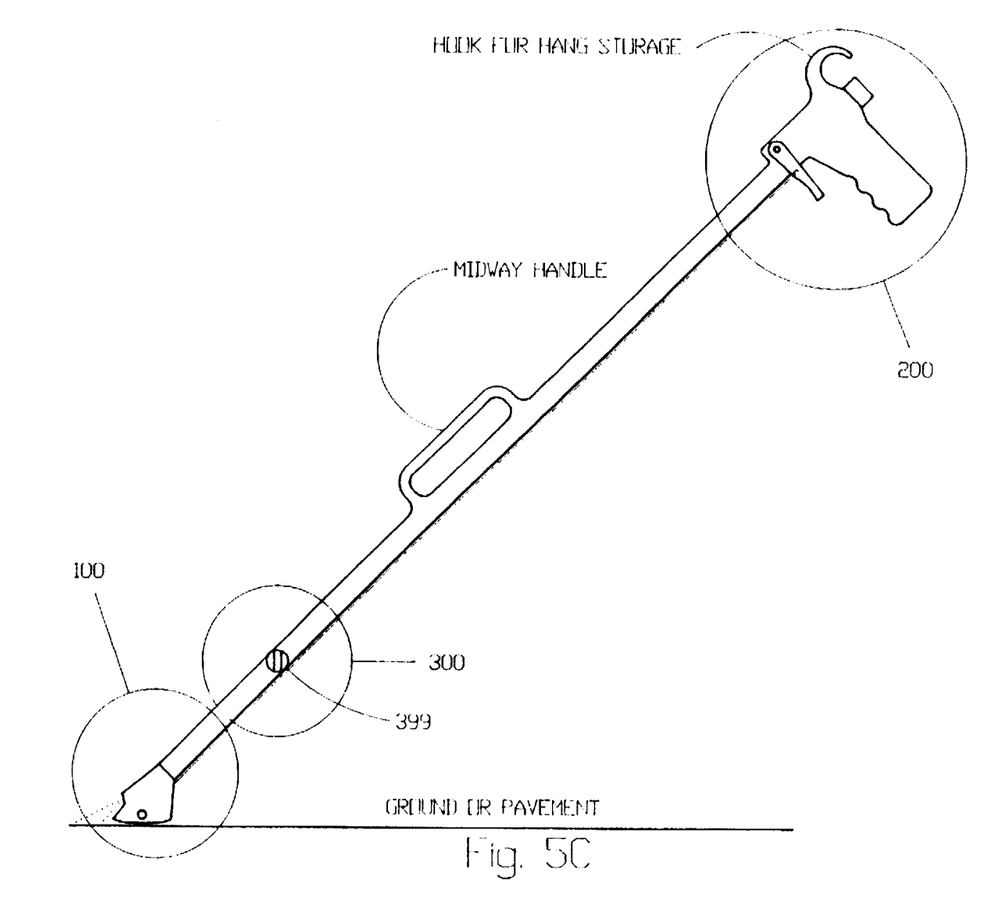
FIG. 5C is an exterior side view of the second preferred embodiment of FIGS. 5A-5B showing the outside raised surface of the valve control.

FIG. 5B is a perspective side view of the second preferred embodiment 300 of FIG. 5A with valve control 320 moved to another position allowing the embodiment 300 to dispense a spray while the apparatus is angled upward in the direction of arrow H such as a corner between a wall 410 and a ceiling 415. In FIG. 5B, through-opening 325 in valve 320 communicates between chamber 370 and into an opening 390 that attaches to a tube extension 395 and to a lower feed opening 396 which draws liquid into the tube. Liquid inside of hollow handgrip 215 can be shown by exemplary liquid level 295. Successive compressions of trigger 220 causes liquid to be sucked into tube 395 and ultimately dispensed through spray nozzle 120. FIG. 5B can be used to dispense liquid insecticide stored inside to spray airborne insects such as but not limited to spiders, and the like. FIG. 5C is an exterior side view of the second preferred embodiment 300 of FIGS. 5A-5B showing the outside raised surface 399 of the valve control.

All the components of the invention depicted in the Figures can be formed from injection molded plastic and the like with the spring 141, trigger rod 158, and ball check valves 135 and 139 being formed from rust resistant metal such as but not limited to aluminum, stainless steel, galvanized steel and the like. Conventional O-rings, and rubber gaskets can be provided to further seal the interior of the apparatus. The length of the storage tube 150 can be approximately two to three feet in length with a diameter of approximately 1 & ½ to 3 three inches.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A handheld sprayer apparatus for fertilizer, weed control and insecticides, the apparatus comprising:

(a) a handgrip having a movable trigger;

(b) a sprayer nozzle having an adjustable nozzle tip for adjusting beam spray width of a spray pattern and a swivel base support for the nozzle tip;

(c) a hollow longitudinal storage tube for storing liquid, having a lower end connected to the sprayer nozzle and an upper end connected to the handgrip, the tube allowing for the liquid to be gravity fed to the sprayer nozzle; and (d) a wheel attached adjacent to the sprayer nozzle, for allowing the apparatus to roll over surfaces, wherein moving the trigger to a compressed position causes the sprayer nozzle to release the gravity fed liquid.

2. The handheld sprayer apparatus of claim 1, wherein the hand grip includes:

a curved hook portion for supporting the apparatus during non use.

3. The handheld sprayer apparatus of claim 1, further comprising:

a spring compressable piston having an initial extended position and a compressed position for releasing a portion of the liquid in the storage tube through the spray nozzle;

a trigger rod parallel and exterior to the longitudinal tube for connecting the trigger to the spring compressable piston, wherein moving the trigger causes the piston to move to the compressed position.

4. The handheld sprayer apparatus of claim 1, wherein the wheel includes:

a rounded exterior edge.

5. The handheld sprayer apparatus of claim 1, wherein the wheel includes:

conical side edges and a flat exterior edge.

6. The handheld sprayer apparatus of claim 1, further comprising:

a housing for supporting the sprayer nozzle, the housing having a lower convex curved surface.

7. The handheld sprayer apparatus of claim 1, further comprising:

a protruding second grip portion located approximately midway along the storage tube.

8. The handheld sprayer apparatus of claim 1, the liquid storage tube having:

visible exterior markings for showing the content amounts of liquid stored therein.

9. A handheld sprayer apparatus for liquid fertilizer, weed control and insecticides, the apparatus comprising:

(a) a handgrip having a movable trigger, the handgrip further having a curved hook portion for supporting the apparatus during non use;

(b) a sprayer nozzle;

(c) a hollow longitudinal storage tube for storing liquid, having a lower end connected to the sprayer nozzle and an upper end connected to the handgrip, the tube allowing for the sprayer nozzle to be gravity fed to the pump nozzle;

(d) a wheel attached to the sprayer nozzle, for allowing the apparatus to roll over surfaces, the wheel supported within a housing having a lower convex curved surface;

(e) a spring compressable piston having an initial extended position and a compressed position for releasing a portion of the liquid in the storage tube through the spray nozzle; and (f) a trigger rod parallel and exterior to the longitudinal tube for connecting the trigger to the spring compressable piston, wherein moving the trigger causes the piston to move to the compressed position.

10. The handheld sprayer apparatus of claim 9 wherein the wheel includes:

a rounded exterior edge.

11. The handheld sprayer apparatus of claim 9 wherein the wheel includes:

conical side edges and a flat exterior edge.

12. The handheld sprayer apparatus of claim 9, further comprising:

a protruding second grip portion located approximately midway along the storage tube.

13. A handheld sprayer apparatus for fertilizer, weed control and insecticides, the apparatus comprising:

(a) a handgrip having a movable trigger;

(b) a sprayer nozzle;

(c) a hollow longitudinal storage tube for storing liquid, having a lower end connected to the sprayer nozzle and an upper end connected to the handgrip, the tube allowing for the liquid to be gravity fed to the sprayer nozzle;

(d) a trigger rod parallel and exterior to the longitudinal tube for connecting the trigger to a spring compressable piston, wherein moving the trigger causes the piston to move to a compressed position forcing a portion of the liquid out the spray nozzle: and (e) a wheel attached adjacent to the sprayer nozzle, for allowing the apparatus to roll over surfaces, wherein moving the trigger to a compressed position causes the sprayer nozzle to release the gravity fed liquid.

* * * * *